(12) United States Patent
Rahman et al.

(10) Patent No.: US 11,891,061 B2
(45) Date of Patent: Feb. 6, 2024

(54) TARGET VEHICLE DETECTION

(71) Applicant: Ford Global Technologies, LLC, Dearborn, MI (US)

(72) Inventors: Yousaf Rahman, Ypsilanti, MI (US); Hongtei Eric Tseng, Canton, MI (US); Mrdjan J. Jankovic, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 301 days.

(21) Appl. No.: 17/350,707

(22) Filed: Jun. 17, 2021

(65) Prior Publication Data
US 2022/0402486 A1 Dec. 22, 2022

(51) Int. Cl.
*B60W 30/12* (2020.01)
*B60W 40/107* (2012.01)
*B60W 40/105* (2012.01)
*B60W 10/20* (2006.01)
*B60W 10/18* (2012.01)

(52) U.S. Cl.
CPC ............ *B60W 30/12* (2013.01); *B60W 10/18* (2013.01); *B60W 10/20* (2013.01); *B60W 40/105* (2013.01); *B60W 40/107* (2013.01); B60W 2520/06 (2013.01); B60W 2520/105 (2013.01); B60W 2554/801 (2020.02); B60W 2554/802 (2020.02); B60W 2554/804 (2020.02)

(58) Field of Classification Search
CPC ...... B60W 30/12; B60W 10/18; B60W 10/20; B60W 40/105; B60W 40/107; B60W 2554/804; B60W 2554/802; B60W 2554/801; B60W 2520/06; B60W 2520/105
See application file for complete search history.

(56) References Cited

U.S. PATENT DOCUMENTS

| | | | |
|---|---|---|---|
| 7,016,783 B2 | 3/2006 | Hac et al. | |
| 10,384,717 B2 | 8/2019 | Choi et al. | |
| 2009/0143951 A1 | 6/2009 | Takahashi et al. | |
| 2017/0101094 A1* | 4/2017 | Fiaschetti | B60W 50/14 |
| 2017/0358209 A1 | 12/2017 | Ohmori et al. | |
| 2018/0105170 A1* | 4/2018 | Nagae | G06V 20/588 |
| 2019/0118809 A1* | 4/2019 | Niino | B60T 7/12 |
| 2019/0351941 A1* | 11/2019 | Uematsu | B62D 6/02 |

(Continued)

*Primary Examiner* — Jeff A Burke
*Assistant Examiner* — Mohamad O El Sayah
(74) *Attorney, Agent, or Firm* — Frank A. MacKenzie; Bejin Bieneman PLC

(57) ABSTRACT

A lateral virtual boundary for a host vehicle is identified based on a lateral distance between the host vehicle and a target vehicle, a longitudinal distance between the host vehicle and the target vehicle, and a speed of the target vehicle relative to the host vehicle. A forward virtual boundary for the host vehicle is identified based on the longitudinal distance between the host vehicle and the target vehicle. A lateral constraint value of the lateral virtual boundary and a forward constraint value of the forward virtual boundary are determined. A longitudinal acceleration and a steering angle are determined based on the lateral and forward virtual boundaries and the lateral and forward constraint values. One or both of a steering component or a brake are actuated based on the longitudinal acceleration and the steering angle.

17 Claims, 5 Drawing Sheets

(56) References Cited

U.S. PATENT DOCUMENTS

| | | | |
|---|---|---|---|
| 2020/0070818 A1* | 3/2020 | Tominaga | B60W 10/20 |
| 2020/0353918 A1 | 11/2020 | Goto et al. | |
| 2020/0398894 A1* | 12/2020 | Hudecek | G05D 1/0214 |
| 2021/0362720 A1* | 11/2021 | Takahashi | B62D 6/003 |
| 2022/0073098 A1* | 3/2022 | D'Orazio | B60W 50/14 |

* cited by examiner

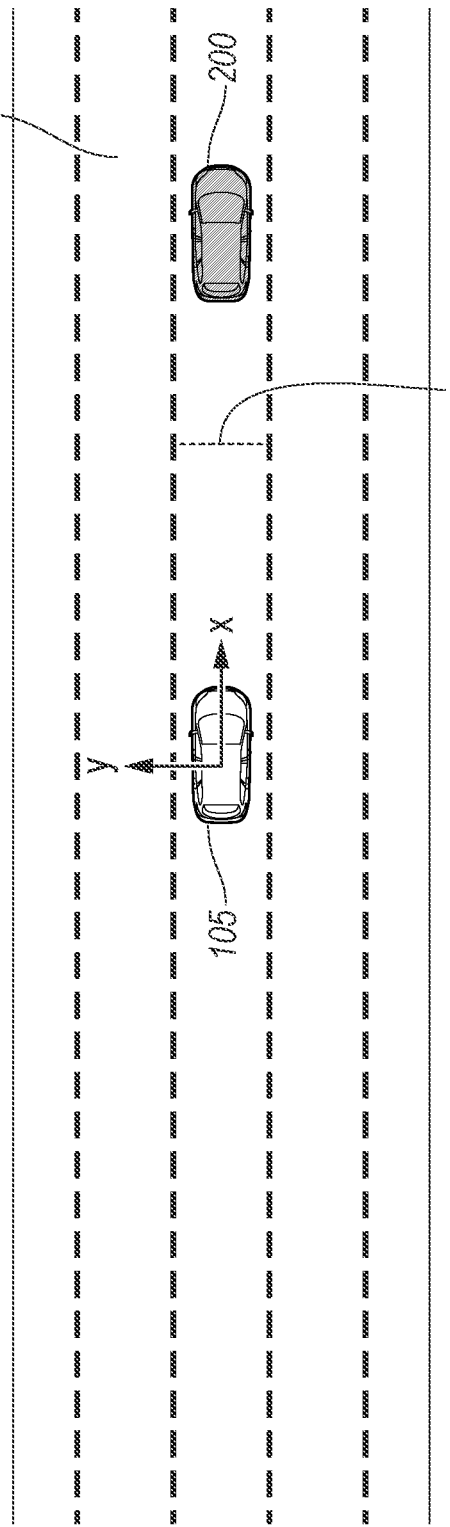
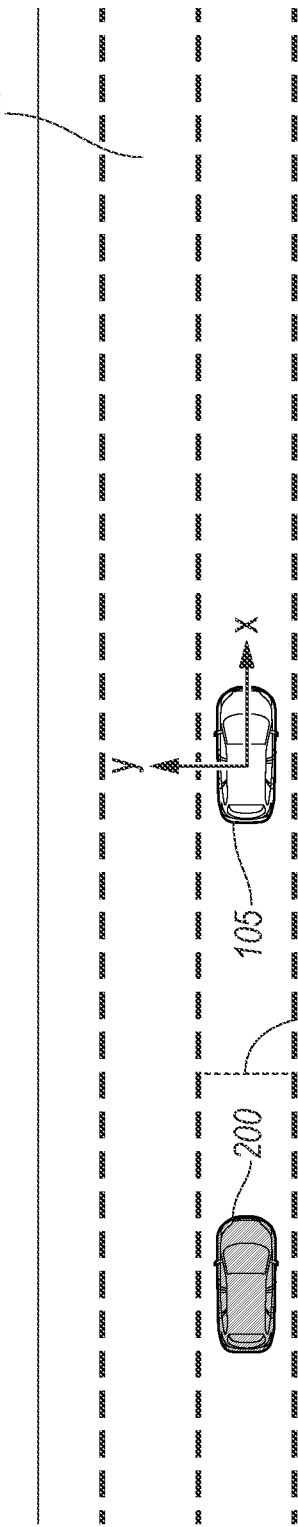
FIG. 2C
FIG. 2D

TARGET VEHICLE DETECTION

BACKGROUND

A vehicle can use sensors to detect objects. For example, an object on a roadway can be referred to as a target, or target object. Vehicle sensors can detect a target position and speed relative to the vehicle. For example, the sensors can detect the position of the target relative to the vehicle. The vehicle can respond to detecting the target, e.g., by steering away from the target, by braking prior to reaching the target, etc.

BRIEF DESCRIPTION OF THE DRAWINGS

FIGS. 2A-2D are views of a host vehicle, a target vehicle, and virtual boundaries.

DETAILED DESCRIPTION

Figure 1:
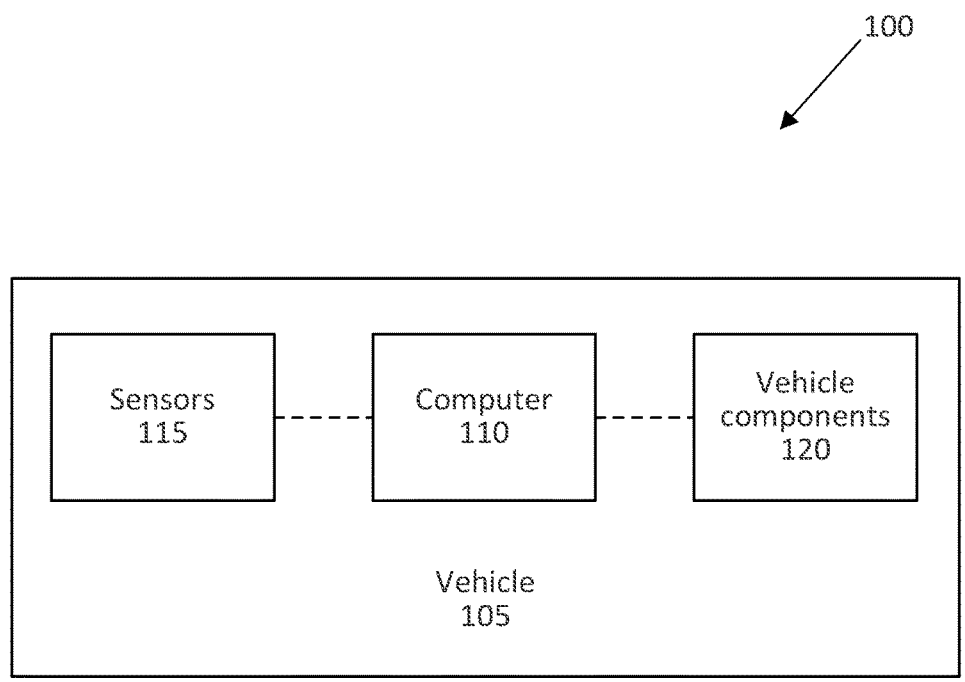
FIG. 1 is a block diagram of an example system for operating a vehicle.

A system includes a computer including a processor and a memory, the memory storing instructions executable by the processor to identify a lateral virtual boundary for a host vehicle based on a lateral distance between the host vehicle and a target vehicle, a longitudinal distance between the host vehicle and the target vehicle, and a speed of the target vehicle relative to the host vehicle and to identify a forward virtual boundary for the host vehicle based on the longitudinal distance between the host vehicle and the target vehicle. The instructions further include instructions to determine a lateral constraint value of the lateral virtual boundary based on a lateral boundary speed, the lateral boundary speed based on a heading angle of the host vehicle. determine a forward constraint value of the forward virtual boundary based on the heading angle of the host vehicle and determine a longitudinal acceleration and a steering angle based on the lateral and forward virtual boundaries and the lateral and forward constraint values. The instructions further include instructions to actuate one or both of a steering component or a brake based on the longitudinal acceleration and the steering angle.

The instructions can further include instructions to determine a left lateral virtual boundary, a right lateral virtual boundary, a left lateral constraint value, and a right lateral constraint value.

A direction of the steering angle can be based on the left lateral virtual boundary satisfying the left lateral constraint value or the right lateral virtual boundary satisfying the right lateral constraint value.

The instructions can further include instructions to determine both the left lateral virtual boundary and the right lateral virtual boundary when the forward constraint value is below a threshold.

The instructions can further include instructions to determine the longitudinal acceleration and the steering angle based on a forward boundary speed satisfying the forward constraint value and the lateral boundary acceleration satisfying the lateral constraint value.

The instructions can further include instructions to, upon determining that the lateral constraint value is below a first threshold and that the forward constraint value is below a second threshold, actuate one or both of the steering component or the brake based on a distance between the host vehicle and the target vehicle and the speed of the target vehicle relative to the host vehicle.

The instructions can further include instructions to actuate only the brake when the speed is below a speed threshold and the distance is above a first distance threshold and to actuate only the steering component when the speed is above the speed threshold and the distance is above a second distance threshold.

The speed threshold can be based on a maximum longitudinal deceleration of the host vehicle and a maximum lateral acceleration of the host vehicle.

The instructions can further include instructions to, upon determining that one of (1) the lateral constraint value exceeds a first threshold or (2) the forward constraint value exceeds a second threshold, suppress actuation of the steering component to move the host vehicle to an adjacent roadway lane.

The instructions can further include instructions to determine a lane boundary and a lane constraint value based on the lane boundary.

The instructions can further include instructions to determine the steering angle based on the lane constraint value and a lane boundary acceleration.

The instructions can further include instructions to determine the lane boundary acceleration based on the heading angle of the host vehicle and a current steering angle of the host vehicle.

A method includes identifying a lateral virtual boundary for a host vehicle based on a lateral distance between the host vehicle and a target vehicle, a longitudinal distance between the host vehicle and the target vehicle, and a speed of the target vehicle relative to the host vehicle, identifying a forward virtual boundary for the host vehicle based on the longitudinal distance between the host vehicle and the target vehicle, determining a lateral constraint value of the lateral virtual boundary based on a lateral boundary speed, the lateral boundary speed based on a heading angle of the host vehicle, determining a forward constraint value of the forward virtual boundary based on the heading angle of the host vehicle, determining a longitudinal acceleration and a steering angle based on the lateral and forward virtual boundaries and the lateral and forward constraint values, and actuating one or both of a steering component or a brake based on the longitudinal acceleration and the steering angle.

The method can further include determining a left lateral virtual boundary, a right lateral virtual boundary, a left lateral constraint value, and a right lateral constraint value.

The method can further include determining both the left lateral virtual boundary and the right lateral virtual boundary when the forward constraint value is below a threshold.

The method can further include determining the longitudinal acceleration and the steering angle based on a forward boundary speed satisfying the forward constraint value and the lateral boundary acceleration satisfying the lateral constraint value.

The method can further include, upon determining that the lateral constraint value is below a first threshold and that the forward constraint value is below a second threshold, actuating one or both of the steering component or the brake based on a distance between the host vehicle and the target vehicle and the speed of the target vehicle relative to the host vehicle.

The method can further include actuating only the brake when the speed is below a speed threshold and the distance is above a first distance threshold and actuating only the steering component when the speed is above the speed threshold and the distance is above a second distance threshold.

The method can further include, upon determining that one of (1) the lateral constraint value exceeds a first threshold or (2) the forward constraint value exceeds a second threshold, suppressing actuation of the steering component to move the host vehicle to an adjacent roadway lane.

The method can further include determining a lane boundary and a lane constraint value based on the lane boundary.

The method can further include determining the steering angle based on the lane constraint value and a lane boundary acceleration.

The method can further include determining the lane boundary acceleration based on the heading angle of the host vehicle and a current steering angle of the host vehicle.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Planning operation of a host vehicle, particularly planning steering, acceleration, and braking operation, can include a plan for the host vehicle to remain within a roadway lane on a roadway. A computer in the host vehicle actuates one or more components according to the planned steering, acceleration, and/or braking. Movement of a target vehicle can result in changes to the planned operation of the host vehicle. The computer can identify virtual boundaries with respect to which the lateral and longitudinal movement of the host vehicle. Further, the computer can plan operation of the host vehicle to remain within the virtual boundaries.

The host vehicle can identify one or more constraint values representing motion of the host vehicle and the target vehicle. The constraint values are based on velocity and acceleration at which the host vehicle and the target vehicle approach the virtual boundaries. When one or more of the constraint values violate respective thresholds, the host vehicle can determine a change in the steering angle and a change in the acceleration and/or braking to avoid the target vehicle while remaining within the virtual boundaries. The host vehicle can, based on the changes in the steering angle and the acceleration and/or braking, actuate one or more components. The virtual boundaries, boundary approach velocity, and boundary approach acceleration allow the host vehicle to predict movement of the host vehicle and the target vehicle with less data and fewer computations than other approaches, e.g., a machine learning program. Decoupling the lateral and longitudinal virtual boundaries allows the computer to more quickly and with fewer computations determine whether to steer or to brake the host vehicle than a conventional threat detection and mitigation system.

FIG. 1 illustrates an example system 100 for operating a vehicle 105. A computer 110 in the vehicle 105 is programmed to receive collected data from one or more sensors 115. For example, vehicle 105 data may include a location of the vehicle 105, data about an environment around a vehicle, data about an object outside the vehicle such as another vehicle, etc. A vehicle 105 location is typically provided in a conventional form, e.g., geo-coordinates such as latitude and longitude coordinates obtained via a navigation system that uses the Global Positioning System (GPS). Further examples of data can include measurements of vehicle 105 systems and components, e.g., a vehicle 105 velocity, a vehicle 105 trajectory, etc.

The computer 110 is generally programmed for communications on a vehicle 105 network, e.g., including a conventional vehicle 105 communications bus such as a CAN bus, LIN bus, etc., and or other wired and/or wireless technologies, e.g., Ethernet, WIFI, etc. Via the network, bus, and/or other wired or wireless mechanisms (e.g., a wired or wireless local area network in the vehicle 105), the computer 110 may transmit messages to various devices in a vehicle 105 and/or receive messages from the various devices, e.g., controllers, actuators, sensors, etc., including sensors 115. Alternatively or additionally, in cases where the computer 110 actually comprises multiple devices, the vehicle network may be used for communications between devices represented as the computer 110 in this disclosure. For example, the computer 110 can be a generic computer with a processor and memory as described above and/or may include a dedicated electronic circuit including an ASIC that is manufactured for a particular operation, e.g., an ASIC for processing sensor data and/or communicating the sensor data. In another example, computer 110 may include an FPGA (Field-Programmable Gate Array) which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in computer 110.

In addition, the computer 110 may be programmed for communicating with a network, which may include various wired and/or wireless networking technologies, e.g., cellular, Bluetooth®, Bluetooth® Low Energy (BLE), wired and/or wireless packet networks, etc.

The memory can be of any type, e.g., hard disk drives, solid state drives, servers, or any volatile or non-volatile media. The memory can store the collected data sent from the sensors 115. The memory can be a separate device from the computer 110, and the computer 110 can retrieve information stored by the memory via a network in the vehicle 105, e.g., over a CAN bus, a wireless network, etc. Alternatively or additionally, the memory can be part of the computer 110, e.g., as a memory of the computer 110.

Sensors 115 can include a variety of devices. For example, various controllers in a vehicle 105 may operate as sensors 115 to provide data via the vehicle 105 network or bus, e.g., data relating to vehicle speed, acceleration, location, subsystem and/or component status, etc. Further, other sensors 115 could include cameras, motion detectors, etc., i.e., sensors 115 to provide data for evaluating a position of a component, evaluating a slope of a roadway, etc. The sensors 115 could, without limitation, also include short range radar, long range radar, LIDAR, and/or ultrasonic transducers.

Collected data can include a variety of data collected in a vehicle 105. Examples of collected data are provided above, and moreover, data are generally collected using one or more sensors 115, and may additionally include data calculated therefrom in the computer 110, and/or at the server. In general, collected data may include any data that may be gathered by the sensors 115 and/or computed from such data.

The vehicle 105 can include a plurality of vehicle components 120. In this context, each vehicle component 120 includes one or more hardware components adapted to perform a mechanical function or operation-such as moving the vehicle 105, slowing or stopping the vehicle 105, steering the vehicle 105, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like. Components 120 can include computing devices, e.g., electronic control units (ECUs) or the like and/or computing devices such as described above with respect to the computer 110, and that likewise communicate via a vehicle 105 network.

A vehicle 105 can operate in one of a fully autonomous mode, a semiautonomous mode, or a non-autonomous mode. A fully autonomous mode is defined as one in which each of vehicle 105 propulsion (typically via a powertrain including an electric motor and/or internal combustion engine), braking, and steering are controlled by the computer 110. A semi-autonomous mode is one in which at least one of vehicle 105 propulsion (typically via a powertrain including an electric motor and/or internal combustion engine), braking, and steering are controlled at least partly by the computer 110 as opposed to a human operator. In a non-autonomous mode, i.e., a manual mode, the vehicle propulsion, braking, and steering are controlled by the human operator.

FIGS. 2A-2D are views of an example host vehicle 105 and an example target vehicle 200 on a roadway 205. The "target" vehicle 200 is a vehicle detected by the host vehicle 105. As the host vehicle 105 travels along the roadway 205, the computer 110 detects the target vehicle 200 and actuates one or more components 120 to avoid a collision with the target vehicle 200. The computer 110 can define a local two-dimensional coordinate system. The local coordinate system defines points x, y, where x is a coordinate along a longitudinal axis of the host vehicle 105 and y is a coordinate along a lateral axis of the host vehicle 105. That is, x coordinates extend in a vehicle-forward and vehicle-rearward direction (sometimes referred to as a longitudinal direction), and y coordinates extend in a vehicle-crosswise direction (sometimes referred to as a lateral direction).

The computer 110 can determine longitudinal and lateral dynamics of the host vehicle 105 and the target vehicle 200. The "dynamics" are measures of the position, speed, and acceleration of the vehicles 105, 200 in the coordinate system. The dynamics can be determined as a set of differential equations:

$$\dot{x}_T = v_T \cos(\theta_T) - v_H \cos(\theta_H) \quad (1)$$

$$\dot{v}_H = g\alpha \quad (2)$$

$$\dot{y}_T = v_T \sin(\theta_T) - v_H \sin(\theta_H) \quad (3)$$

$$\dot{\theta}_H = \frac{v_H}{L_H}\delta \quad (4)$$

where $x_T$, $y_T$ are the relative x, y coordinates of a center of the target vehicle 200 relative to a center of the host vehicle 105, $\theta_H$, $\theta_T$ are respective heading angles of the host vehicle 105 and the target vehicle 200, $v_H$, $v_T$ are respective speeds of the host vehicle 105 and the target vehicle 200, $L_H$ is the wheelbase of the host vehicle 105 (i.e., the distance between front and rear axles of the host vehicle 105), g is the acceleration constant due to gravity, a is the longitudinal acceleration of the host vehicle 105 in units of standard gravity, where 1 unit of standard gravity is the acceleration equivalent to the acceleration constant due to gravity (i.e., 1 "g" is acceleration equal to Earth's gravity, 2 "g's" is acceleration twice of Earth's gravity, etc.), and δ is the steering angle of the host vehicle 105 in radians. The host vehicle 105 has a lateral width $W_H$.

The longitudinal acceleration $\alpha = \alpha_0 + \alpha_{CF}$ can be a sum of an acceleration $\alpha_0$ provided by an operator or a virtual driver and a correction factor $\alpha_{CF}$ provided by a conventional collision avoidance program or a virtual boundary equation, as described below. The steering angle $\delta = \delta_0 + \delta_{CF}$ can be a sum of a steering angle $\delta_0$ provided by an operator or a virtual driver and a correction factor $\delta_{CF}$ provided by a conventional collision avoidance program or a virtual boundary equation, as described below. The longitudinal acceleration $\alpha$ and the steering angle $\delta$ can be stored in the computer 110 as a control variable matrix $$u = \begin{bmatrix} \alpha \\ \delta \end{bmatrix},$$

which allows the computer 110 to perform matrix mathematics and algorithms on the combined control variable u.

Upon determining the steering angle δ and the longitudinal acceleration α, the computer 110 can actuate one or more components 120 to avoid the target vehicle 200. For example, the computer 110 can actuate a steering motor of a steering component to attain the steering angle δ. In another example, the computer can actuate a brake and/or a propulsion to attain the longitudinal acceleration α. Thus, operation of the vehicle 105 changes upon determining the steering angle and longitudinal acceleration δ, α according to one of the techniques described below.

Figure 2A:
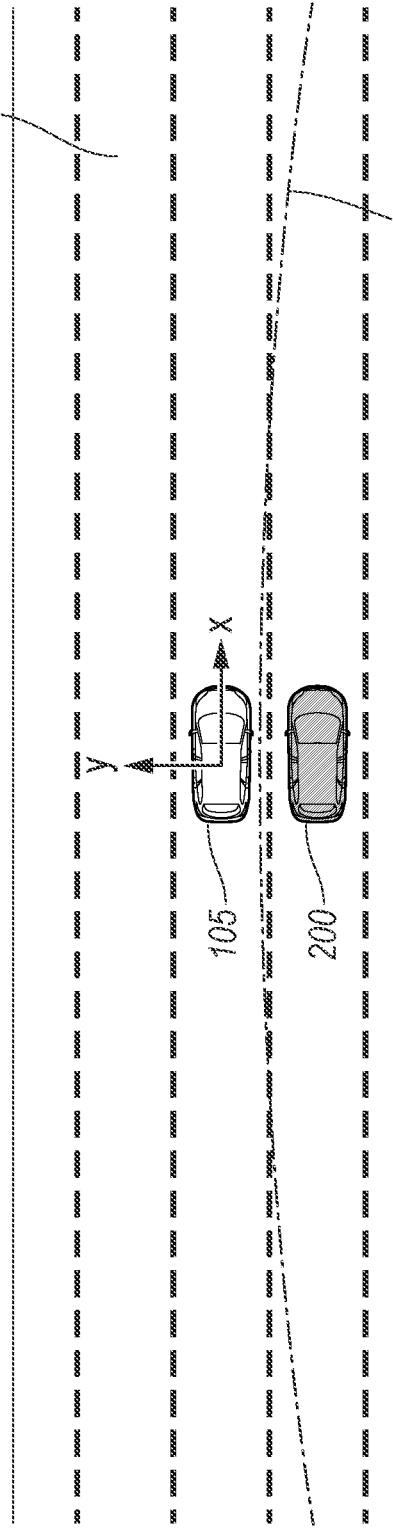
Figure 2B:
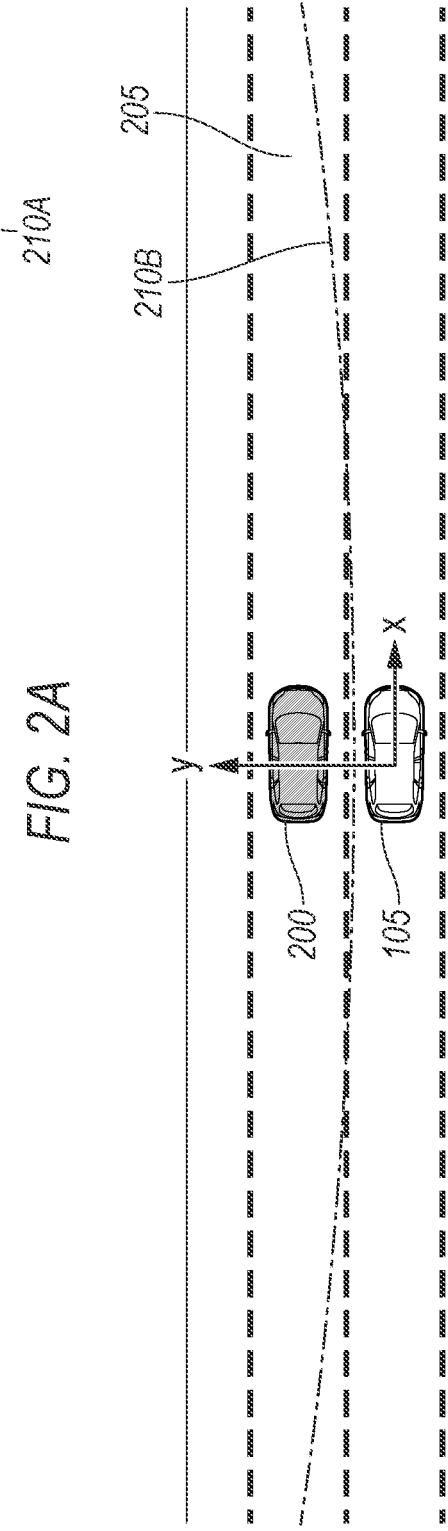

In the example of FIG. 2A, the target vehicle 200 is to the right relative to the host vehicle 105. In the example of FIG. 2B, the target vehicle 200 is to the left relative to the host vehicle 105. In the example of FIG. 2C, the target vehicle 200 is longitudinally forward of the host vehicle 105. In the example of FIG. 2D, the target vehicle 200 is longitudinally behind the host vehicle 105.

The computer 110 can determine a virtual boundary 210 for the host vehicle 105. In this context, a "virtual boundary" is a set of geo-coordinates representing a virtual (straight and/or curved) line on the roadway 205. That is, the virtual boundary 210 is a line beyond which the host vehicle 105 should not travel to avoid a collision with the target vehicle 200. The computer 110 can determine a plurality of virtual boundaries 210, as shown in FIGS. 2A-2D and described below. Thus, the computer 110 can avoid collisions with target vehicles 200 at different locations relative to the host vehicle 105.

FIG. 2A is a view of the host vehicle 105 and the target vehicle 200 to the right of the host vehicle 105. The computer 110 can determine the virtual boundary 210 as a right virtual boundary 210A, i.e., a virtual boundary 210 extending to the right of the host vehicle 105. Thus, the right virtual boundary 210A defines a boundary beyond which the host vehicle 105 should not cross to avoid target vehicles 200 to the right of the host vehicle 105. The computer 110 defines the virtual boundaries 210 according to virtual boundary equations, represented herein by the variable h.

That is, an expression with a variable h outputs values that, in the coordinate system, define the virtual boundaries 210 beyond which a right side of the host vehicle 105 should not cross. In FIGS. 2A-2D, the lines identified as 210A-210D are the outputs of respective virtual boundary equations h defined below. The computer 110 can define the right virtual boundary $h_R$, a right virtual boundary speed $\dot{h}_R$, and a right virtual boundary acceleration $\ddot{h}_R$:

$$h_R = -y_T - d_{y,min} + c_b x_T^2 \tag{5}$$

$$\dot{h}_R = v_H \sin\theta_H - v_T \sin\theta_T + 2c_b x_T (v_T \cos\theta_T - v_H \cos\theta_H) \tag{6}$$

$$\ddot{h}_R = -(\cos\theta_H + 2c_b x_T \sin\theta_H)\frac{v_H^2 \delta}{L_H} + \tag{7}$$

$$(\sin\theta_H + 2c_b x_T \cos\theta_H)g\alpha_0 + 2c_b(v_T \cos\theta_T - v_H \cos\theta_H)^2$$

$$c_b = \max(c_0 - g_b(v_H - v_T), c_{b,min}) \tag{8}$$

where $d_{y,min}$ is a predetermined minimum lateral distance between the host vehicle 105 and the target vehicle 200, $c_b$ is a bowing coefficient that determines the curvature of the virtual boundary $h_R$, $c_0$ is a predetermined default bowing coefficient, $g_b$ is a tunable constant that controls the effect on the speeds $v_H$, $v_T$ on the bowing coefficient, and $c_{b,min}$ is a predetermined minimum bowing coefficient. The predetermined values $d_{y,min}$, $c_0$, $c_{b,min}$ can be determined by, e.g., the manufacturer according to empirical testing of virtual vehicles in a simulation model, such as Simulink. For example, the minimum bowing coefficient $c_{b,min}$ can be determined by solving a constraint equation described below in a virtual simulation for a specified constraint value.

FIG. 2B is a view of the host vehicle 105 and the target vehicle 200 to the left of the host vehicle 105. The computer 110 can determine the virtual boundary 210 as a left virtual boundary 210B, i.e., a virtual boundary 210 extending to the left of the host vehicle 105. Thus, the left virtual boundary 210B defines a boundary beyond which a left side of the host vehicle 105 should not cross to avoid target vehicles 200 to the left of the host vehicle 105. The computer 110 can define the left virtual boundary $h_L$, a left virtual boundary speed $\dot{h}_L$, and a right virtual boundary acceleration $\ddot{h}_L$:

$$h_L = y_T - d_{y,min} + c_b x_T^2 \tag{9}$$

$$\dot{h}_L = v_T \sin\theta_T - v_H \sin\theta_H + 2c_b x_T (v_T \cos\theta_T - v_H \cos\theta_H) \tag{10}$$

$$\ddot{h}_L = (\cos\theta_H - 2c_b x_T \sin\theta_H)\frac{v_H^2 \delta}{L_H} - \tag{11}$$

$$(\sin\theta_H - 2c_b x_T \cos\theta_H)g\alpha_0 + 2c_b(v_T \cos\theta_T - v_H \cos\theta_H)^2$$

FIG. 2C is a view of the host vehicle 105 and the target vehicle 200 forward of the host vehicle 105. The computer 110 can determine the virtual boundary 210 as a forward virtual boundary 210C, i.e., a virtual boundary 210 extending in front of the host vehicle 105. Thus, the forward virtual boundary 210C defines a boundary beyond which a front bumper the host vehicle 105 should not cross to avoid target vehicles 200 in front of the host vehicle 105. The computer 110 can define the forward virtual boundary $h_x$ and a forward virtual boundary speed $\dot{h}_x$:

$$h_x = |x_T| - sgn(x_T)k_v v_H - d_{x,min} - \frac{L_H}{2} - \frac{L_T}{2} \tag{12}$$

$$\dot{h}_x = -sgn(x_T)\left(k_v + \frac{v_H}{dec_{max}}\right)g\alpha + sgn(x_T)(v_T \cos\theta_T - v_H \cos\theta_H) \tag{13}$$

$$k_v = \begin{cases} k_{v0} = \max\left(\frac{v_H - v_T}{dec_{max}}, 1\right) & |y_T| < W_H \\ k_{v0}\exp(\lambda(|y_T| - W_H)) & |y_T| \geq W_H \end{cases} \tag{14}$$

where $k_v$ is a time headway, i.e., an estimated time for the host vehicle 105 to reach the target vehicle 200 in the longitudinal direction, $dec_{max}$ is a maximum deceleration of the host vehicle 105, $k_{v0}$ is a maximum time headway determined by the speeds $v_H$, $v_T$ of the host vehicle 105 and the target vehicle 200, and $\lambda$ is a predetermined decay constant. The computer 110 can determine the decay constant $\lambda$ based on the empirical testing in the virtual simulations described above.

FIG. 2D is a view of the host vehicle 105 and the target vehicle 200 behind the host vehicle 105. The computer 110 can determine the virtual boundary 210 as a rear virtual boundary 210D, i.e., a virtual boundary 210 extending behind the host vehicle 105. The computer 110 can determine the rear virtual boundary 210D with the same expressions as the forward virtual boundary 210C, differing only with the signum function $sgn(x_T)$. That is, when $sgn(x_T)=1$, the computer 110 determines the forward virtual boundary 210C, and when $sgn(x_T)=-1$, the computer 110 determines the rear virtual boundary 210D.

The computer 110 can determine lane-keeping virtual boundaries that define virtual boundaries for the roadway lanes. The lane-keeping virtual boundaries can be described with boundary equations:

$$h_{LK} = \begin{bmatrix} 3w_l - \frac{W_H}{2} - y_H \\ y_H - \frac{W_H}{2} \end{bmatrix} \tag{15}$$

$$\dot{h}_{LK} = \begin{bmatrix} -v_H \theta_H \\ v_H \theta_H \end{bmatrix} \tag{16}$$

$$\ddot{h}_{LK} = \begin{bmatrix} -\frac{v_H^2 \cos\theta_H \delta}{L_H} \\ \frac{v_H^2 \cos\theta_H \delta}{L_H} \end{bmatrix} \tag{17}$$

where $y_H$ is the y-coordinate of the host vehicle 105 of a coordinates system fixed relative to the roadway 205, with the y-coordinate of the right-most roadway lane marker being 0 and $w_l$ is the width of the roadway lane.

The computer 110 can determine constraint values $C_x$, $C_y$ to determine a steering angle $\delta$ and a longitudinal acceleration $\alpha$ that the vehicle 105 should attain to avoid the target vehicle 200. A "constraint value" is a value based on one of the virtual boundaries 210, a boundary approach velocity, and a boundary approach acceleration that indicates motion of the host vehicle 105 to the virtual boundaries 210. The computer 110 can compare the constraint values $C_x$, $C_y$ to respective predetermined thresholds, as described below, to determine which virtual boundaries 210 that the computer 110 should calculate to determine a steering angle and longitudinal acceleration $\delta_{CF}$, $\alpha_{CF}$ avoid the target vehicle 200. The computer 110 can define equations to determine two constraint values $C_x$, $C_y$ based on the virtual boundary equations:

$$C_x = \dot{h}_x + l_0 h_x \tag{18}$$

$$C_y = \ddot{h}_y + l_1 \dot{h}_y + l_0 h_y \tag{19}$$

where $l_0$, $l_1$ are predetermined scalar values that provide real, positive eigenvalues to the equations $C_x \geq 0$, $C_y \geq 0$. Thus, the constraint value $C_x$ is a longitudinal constraint value that is based on the longitudinal boundary approach velocity $\dot{h}_x$. The constraint value $C_y$ a lateral constraint value that is based on a lateral boundary approach velocity $\dot{h}_y$ and a lateral boundary approach acceleration $\ddot{h}_y$. In the Expressions for $C_x$, $C_y$ above, the longitudinal constraint value $C_x$ can be a first-order expression, i.e., only based on the longitudinal boundary approach velocity $\dot{h}_x$ but not the longitudinal boundary acceleration $\ddot{h}_x$, and the lateral constraint value $C_y$ can be a second-order expression, i.e., based on the lateral boundary approach acceleration $\ddot{h}_y$. The first-order expression for $C_x$ includes the longitudinal acceleration $\alpha$, described above, and the second-order expression for $C_y$ includes the steering angle $\delta$, also described above. Thus, the specific orders of these expressions can be determined as a minimum number of differential terms to determine the outputs for $\delta$, $\alpha$.

The computer 110 can determine whether one or both of the constraint values $C_x$, $C_y$ violates a threshold. In this context, a threshold is "violated" if the constraint value $C_x$, $C_y$ is outside a range of values limited or defined by the threshold. For example, the threshold can be violated when the constraint value $C_x$, $C_y$ exceeds the threshold. Alternatively, the threshold can be violated when the constraint value $C_x$, $C_y$ falls below the threshold. In the example of FIGS. 2A-2D, the computer 110 can determine whether to steer and/or brake to avoid the target vehicle 200 based on whether one or both $C_x < 0$ and $C_y < 0$. That is, the computer 110 determines that one or both $C_x$, $C_y$ violate the threshold of 0 when $C_x$, $C_y$ fall below 0. The thresholds can be determined based on empirical testing of virtual vehicles in a virtual simulation, as described above.

If both $C_x < 0$, $C_y < 0$, the computer 110 determines a relative distance d between the host vehicle 105 and the target vehicle 200 and a relative speed $v_R = v_H - v_T$ between the host vehicle 105 and the target vehicle 200. The computer 110 determines whether to actuate one or both of the brake and the steering component based on the distance d and the speed $v_R$. The computer 110 compares the distance d to a minimum braking distance $d_b$ and a minimum steering distance $d_s$, and the computer 110 can compare the speed $v_R$ to a critical speed $v_{crit}$:

$$d_b = \frac{v_R^2}{2 dec_{max}} \quad (20)$$

$$d_s = \sqrt{\frac{2 d_{min}}{a_{y,max}}} v_R \quad (21)$$

$$v_{crit} = 2 dec_{max} \sqrt{\frac{2 d_{min}}{a_{y,max}}} \quad (22)$$

where $d_{min}$ is a predetermined minimum distance threshold, $\alpha_{y,max}$ is a maximum lateral acceleration that the host vehicle 105 can perform, and $dec_{max}$ is a maximum deceleration of the host vehicle 105. The critical speed $v_{crit}$ is thus the speed at which the minimum braking distance equals the minimum steering distance, i.e., $d_b = d_s$. Based on the comparisons, the computer 110 can determine whether to actuate one or both of the steering and brake to maintain the host vehicle 105 within one or more of the virtual boundaries $h_L$, $h_R$, $h_y$, as described below. For example, the computer 110 can determine the components 120 to actuate based on a lookup table or the like:

TABLE 1

Component Actuation Lookup Table

| Distance | Speed | Components Actuated |
| --- | --- | --- |
| $d > d_s$ | $v_R > v_{crit}$ | Steering |
| $d > d_b$ | $v_R < v_{crit}$ | Brake |
| $d < \min(d_s, d_b)$ | any | Steering and Brake |
| $d < d_{min}$ | any | Steering and Brake |

The computer 110 can actuate the steering and/or the brake according to a specified steering angle $\delta_{CF}$ and a specified longitudinal acceleration $\alpha_{CF}$. The computer 110 can determine the specified steering angle and longitudinal acceleration $\delta_{CF}$, $\alpha_{CF}$ by solving second-order virtual boundary equations with an optimization program. The "optimization program" is a program that minimizes a cost function subject to one or more constraint values determined by the virtual boundary equations. For example, the optimization program can be a quadratic program algorithm, as described below. In another example, the optimization program can be a mixed integer linear programming algorithm, as described below.

The computer 110 can determine a specified steering angle and longitudinal acceleration $\delta_{CF}$, $\alpha_{CF}$ with a quadratic program algorithm. A "quadratic program" algorithm is a conventional optimization program that minimizes a quadratic cost function J for values of $\delta_{CF}$, $\alpha_{CF}$. The computer 110 can determine a lateral left quadratic program $QP_{yL}$, a lateral right quadratic program $QP_{yR}$, and a longitudinal quadratic program $QP_x$, each with a respective cost function $J_{yL}, J_{yR}, J_x$.

The computer 110 can determine the lateral left cost function $J_{yL}$ for lateral left quadratic program $QP_{yL}$:

$$J_{yL} = [\delta_{CF,L} \; s \; s_a] Q_y \begin{bmatrix} \delta_{CF,L} \\ s \\ s_a \end{bmatrix} \quad (23)$$

$$\text{subject to } \ddot{h}_{L,T} + l_{1,y}\dot{h}_{L,T} + l_{0,y}h_{L,T} \geq 0 \quad (24)$$

$$\ddot{h}_{y,i} + l_{1,y}\dot{h}_{y,i} + l_{0,y}h_{y,i} \geq 0, \forall i \in Y \quad (25)$$

$$\ddot{h}_{L,LK} + l_{1,LK}\dot{h}_{L,LK} + l_{0,LK}h_{L,LK} + \begin{bmatrix} 1 \\ 1 \end{bmatrix} s \geq 0 \quad (26)$$

$$\delta_{min} - \delta_0 \leq \delta_{CF,L} + s_a \quad (27)$$

$$\delta_{CF,L} - s_a \leq \delta_{max} - \delta_0 \quad (28)$$

where $Q_y$ diagonal matrix with cost weights on the optimization variables $\delta_{CF,L}, s, s_a$, i is an index for the set of Y targets other than the target vehicle 200. S, sa are what are conventionally referred to as "slack variables," i.e., tunable variables that prevent violation of one or more of the constraint values when the steering would otherwise be unable to prevent the violation. A high penalty can be used for the slack variables to discourage their use to satisfy the constraint inequality if the steering could prevent the violation of the constraint values. The subscript "T" refers to the target vehicle 200, the "LK" subscript refers to values for the lane-keeping virtual boundaries described above, and $\delta_{min}$, $\delta_{max}$ are minimum and maximum steering angles that the steering component can attain.

The computer 110 can determine the lateral right cost function $J_{yR}$ for the lateral right quadratic program $QP_{yR}$:

$$J_{yR} = [\delta_{CF,R} \quad s \quad s_a]Q_y\begin{bmatrix}\delta_{CF,R}\\s\\s_a\end{bmatrix} \quad (29)$$

subject to $\ddot{h}_{R,T} + l_{1,y}\dot{h}_{R,T} + l_{0,y}h_{R,T} \geq 0$ (30)

$\ddot{h}_{y,i} + l_{1,y}\dot{h}_{y,i} + l_{0,y}h_{y,i} \geq 0, \forall i \in Y$ (31)

$\ddot{h}_{R,LK} + l_{1,LK}\dot{h}_{R,LK} + l_{0,LK}h_{R,LK} + \begin{bmatrix}1\\1\end{bmatrix}s \geq 0$ (32)

$\delta_{min} - \delta_0 \leq \delta_{CF,R} + s_a$ (33)

$\delta_{CF,R} - s_a \leq \delta_{max} - \delta_0$ (34)

The computer 110 can solve the quadratic programs $QP_{yL}$, $QP_{yR}$ for the steering angles $\delta_{CF,L}$, $\delta_{CF,R}$ and can determine the steering angle $\delta_{CF}$ as one of these determined steering angles $\delta_{CF,L}$, $\delta_{CF,R}$. For example, if one of the steering angles $\delta_{CF,L}$, $\delta_{CF,R}$ is infeasible and the other is feasible, the computer 110 can determine the steering angle $\delta_{CF}$ as the feasible one of $\delta_{CF,L}$, $\delta_{CF,R}$. In this context, a steering angle $\delta$ is "feasible" if the steering component 120 can attain the steering angle $\delta$ while satisfying all of the constraints for $QP_{yL}$ or for $QP_{yR}$, shown in the above Expressions. A steering angle is "infeasible" if the steering component 120 cannot attain the steering angle $\delta$ without violating at least one of the constraints for $QP_{yL}$ or for $QP_{yR}$, shown in the above Expressions. The solution to the quadratic programs $QP_{yL}$, $QP_{yR}$ can be infeasible as described above, and the computer 110 can disregard infeasible steering angle determinations.

If both $\delta_{CF,L}$, $\delta_{CF,R}$ are feasible, the computer 110 can select one of the steering angles $\delta_{CF,L}$, $\delta_{CF,R}$ as the determined steering angle $\delta_{CF}$ based on a set of predetermined conditions. The predetermined conditions can be a set of rules determined by, e.g., a manufacturer, to determine which of the steering angles $\delta_{CF,L}$, $\delta_{CF,R}$ to select as the determine steering angle $\delta_{CF}$. For example, if both $\delta_{CF,L}$, $\delta_{CF,R}$ are feasible, the computer 110 can use the steering angle with the lower cost of $J_{yL}$, $J_{yR}$, or the computer 110 can determine the steering angle $\delta_{CF}$ as a previously determined one of $\delta_{CF,L}$, $\delta_{CF,R}$. That is, if the computer 110 in a most recent iteration selected $\delta_{CF,L}$ as the determined steering angle $\delta_{CF}$, the computer 110 can select the current $\delta_{CF,L}$ as the determined steering angle $\delta_{CF}$. In another example, if a difference between the cost functions $J_{yL}$, $J_{yR}$ are below a predetermined threshold (e.g., 0.00001), the computer 110 can have a default selection of the steering angle $\delta_{CF}$, e.g., $\delta_{CF,L}$ can be the default selection for the steering angle $\delta_{CF}$.

If both $\delta_{CF,L}$, $\delta_{CF,R}$ are infeasible, the computer 110 can determine the cost functions $J_{yL}$, $J_{yR}$ with a longitudinal constraint replacing the lateral constraint. That is, in the expressions with $h_{y,i}$ above, the computer 110 can systematically replace the lateral virtual boundary equations $h_{y,i}$ with the longitudinal virtual boundary equations $h_{x,i}$ instead. Then, the computer 110 can determine the steering angle $\delta_{CF}$ based on whether the values for $\delta_{CF,L}$, $\delta_{CF,R}$ are feasible, as described above. If $\delta_{CF,L}$, $\delta_{CF,R}$ are still infeasible, the computer 110 can apply a brake 120 to slow the vehicle 105 and avoid the target vehicle 200:

To determine the acceleration $\alpha_{CF}$, the computer 110 can determine a longitudinal quadratic program $QP_x$:

$\alpha_{CF} = \text{argmin} \alpha_{CF}^2$ (35)

subject to $\ddot{h}_{x,i} + l_{0,x}h_{x,i} \geq 0, i \in X$ (36)

where argmin( ) is the argument minimum function, as is known, that determines the minimum of the input subject to one or more constraints, and X is the set of targets other than the target vehicle 200.

Alternatively, the computer 110 can determine the steering angle and longitudinal acceleration $\delta_{CF}$, $\alpha_{CF}$ with a Mixed Integer Linear Programming (MILP) algorithm. The MILP algorithm can be described as a set of expressions for one target vehicle 200:

$\ddot{h}_{x,i} + l_{0,x}h_{x,i} + Ma_1 \geq 0$ (37)

$\ddot{h}_{R,T} + l_{1,y}\dot{h}_{R,T} + l_{0,y}h_{R,T} + Ma_2 \geq 0$ (38)

$\ddot{h}_{L,T} + l_{1,y}\dot{h}_{L,T} + l_{0,y}h_{L,T} + Ma_3 \geq 0$ (39)

$\ddot{h}_{LK} + l_{1,LK}\dot{h}_{LK} + l_{0,LK}h_{LK} + [_1{}^1]s \geq 0$ (40)

where $a_1$, $a_2$, $a_3$ are binary variables taking values of either 0 or 1 such that $a_1 = 0$ when the longitudinal constraint is enforced, $a_2 = 0$ when the left lateral constraint is enforced, and $a_3 = 0$ when the right lateral constraint is enforced, and M is a number selected by the manufacturer during testing such that the inequalities in the expressions above remain true for typical vehicle operation when $a_1$, $a_2$, $a_3$ are nonzero. Thus, the MILP algorithm considers all of the longitudinal and lateral virtual boundaries 210 described above. The MILP algorithm solves the set of expressions according to a "control objective," i.e., a set of conditions or constraints for which the MILP algorithm optimizes the expressions. That is, the control objective defines the limits and/or constraints of the physical system that the expressions simulate.

The computer 110 can solve the expressions above according to a control objective:

$$\min\left(h_\delta|\delta_{CF}| + H_\alpha|\alpha_{CF}| + H_s s + \right. \quad (41)$$

$$\left. H_\Delta|\Delta\delta_{CF}| + H_\Delta|\Delta\alpha_{CF}| + \sum_l H_{\Delta a}|\Delta a_l| + \sum_m H_{\Delta a}|\Delta a_m|\right)$$

subject to $\ddot{h}_{x,j} + l_{0,x}h_{x,j} + Ma_l \geq 0$ (42)

$\ddot{h}_{R,j} + l_{1,y}\dot{h}_{R,j} + l_{0,y}h_{R,j} + Ma_m \geq 0$ (43)

$\ddot{h}_{L,j} + l_{1,y}\dot{h}_{L,j} + l_{0,y}h_{L,j} + Ma_n \geq 0$ (44)

$\ddot{h}_{LK} + l_{1,LK}\dot{h}_{LK} + l_{0,LK}h_{LK} + \begin{bmatrix}1\\1\end{bmatrix}s \geq 0$ (45)

$a_i \in \{0, 1\}, i = \{1, 2, 3, \ldots, 18\}$ (46)

$a_l + a_m + a_n \leq 2$ (47)

$u_{min} - u_0 \leq u_{CF} \leq u_{max} - u_0$ (48)

$j \in \{1, 2, 3, 4, 5, 6\}$ (49)

$l \in \{1, 4, 7, 10, 13, 16\}$ (50)

$m \in \{2, 5, 8, 11, 14, 17\}$ (51)

$n \in \{3, 6, 9, 12, 15, 18\}$ (52)

where j, l, m, n are integer indexes having specified values listed in the expressions above. The relations of the indexes j, l, m, n and the values of l, m, n in the above Expressions are given by the table below.

TABLE 2

Indexes for Control Objective

| j | l | m | n |
|---|---|---|---|
| 1 | 1 | 2 | 3 |
| 2 | 4 | 5 | 6 |
| 3 | 7 | 8 | 9 |
| 4 | 10 | 11 | 12 |
| 5 | 13 | 14 | 15 |
| 6 | 16 | 17 | 18 |

$H_v$ in the above Expression is a cost weight on an optimization variable v. By solving the expressions above with a conventional MILP algorithm solver, the computer 110 can determine a value for the control variable $u_{CF}$ (i.e., the steering angle $\delta_{CF}$ and the longitudinal acceleration $\alpha_{CF}$) to avoid the target vehicle 200 and other targets, six total targets in this example.

Figure 3:
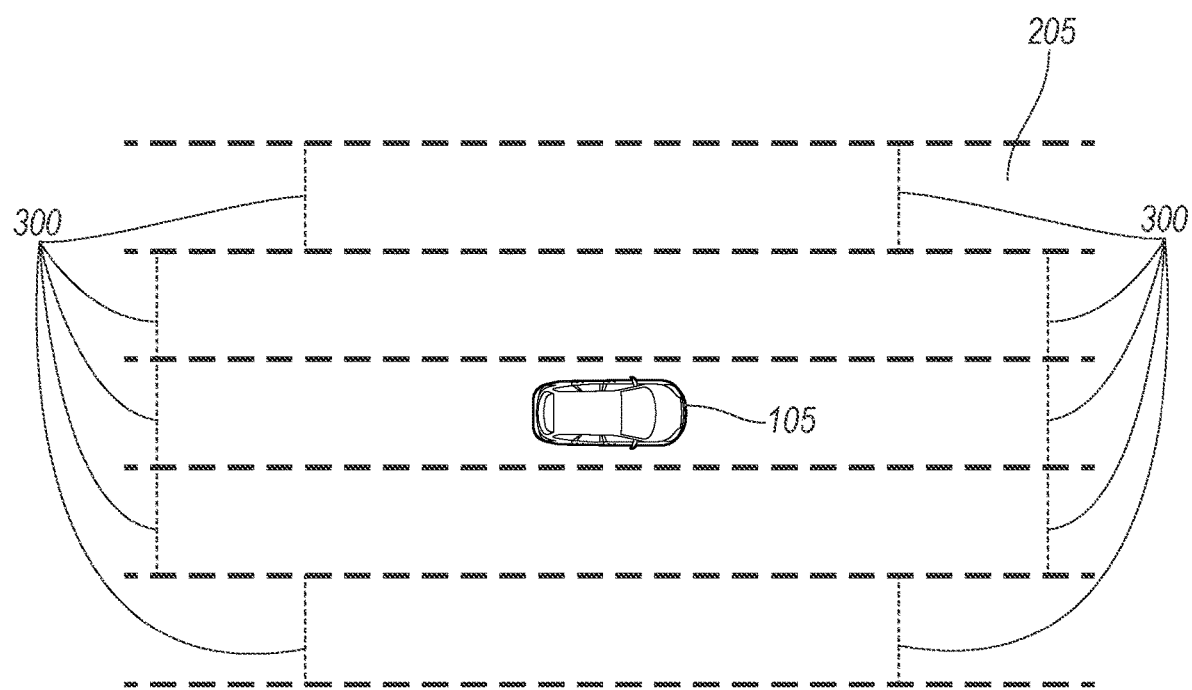
FIG. 3 is a view of the host vehicle and a plurality of distance thresholds.

FIG. 3 is a top-down view of the host vehicle 105 and longitudinal distance thresholds 300 on the roadway 205. The longitudinal distance thresholds 300 define distances that, when a target vehicle 200 crosses, the computer 110 actuates collision mitigation and avoidance. As described above, the computer 110 can determine the longitudinal distance thresholds 300 when at least one of $C_x<0$ or $C_y<0$. That is, the longitudinal distance thresholds 300 indicate whether the target vehicle 200 is close enough to the host vehicle 105 such that the host vehicle 105 may require collision mitigation and avoidance when the host vehicle 105 moves to an adjacent roadway lane. For example, the longitudinal distance thresholds 300 for a current roadway lane and the immediately adjacent roadway lanes may be farther longitudinally forward of the host vehicle 105 than longitudinal distance thresholds 300 in lanes farther away than the adjacent roadway lanes. Thus, when a target vehicle 200 is within one of the longitudinal distance thresholds, the computer 110 can suppress lane changing operation of the host vehicle 105 and actuate one or more components 120 to perform threat mitigation on the target vehicle 200.

Because only one of the constraint values $C_x$, $C_y$ is below its respective threshold, the target vehicle 200 is not likely a threat, and the computer 110 determines the respective virtual boundary $h_L$, $h_R$ based on the location of the target vehicle 200 relative to the host vehicle 105. For example, if the target vehicle 200 is within the distance thresholds 300 and to the right of the host vehicle 105, the computer 110 determines the left virtual boundary $h_L$ to prevent the host vehicle 105 from drifting out of a current roadway lane and to thereby avoid the target vehicle 200. In another example, if the target vehicle 200 is within the distance thresholds 300 and to the left of the host vehicle 105, the computer 110 determines the right virtual boundary $h_R$ to prevent the host vehicle 105 from drifting out of the current roadway lane, and to thereby avoid the target vehicle 200.

Figure 4:
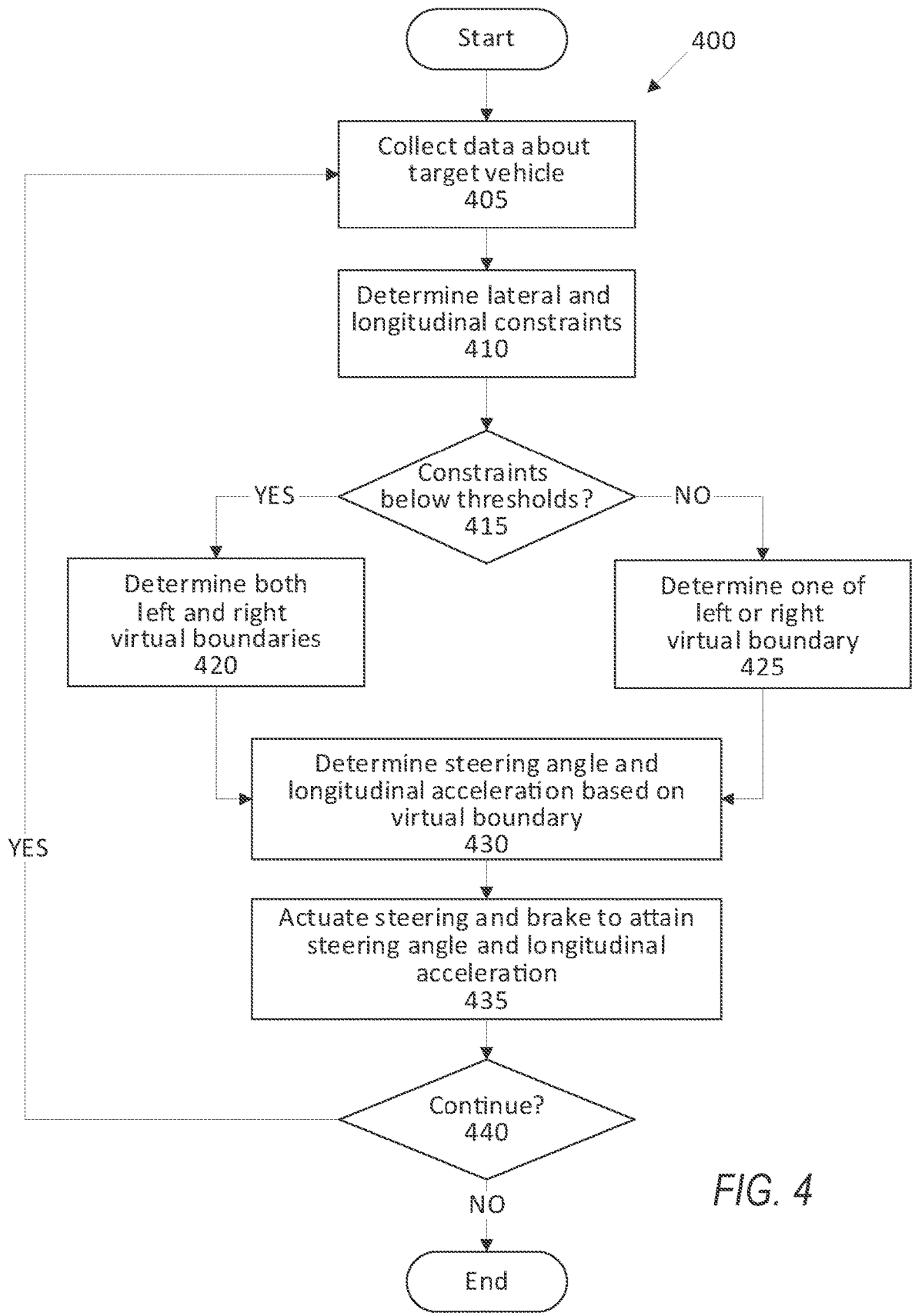
FIG. 4 is a block diagram of an example process for operating the vehicle.

FIG. 4 is an example process 400 for operating a host vehicle 105 to avoid a target vehicle 200. The process 400 begins in a block 405, in which a computer 110 of the host vehicle 105 collects data about the target vehicle 200. The computer 110 can actuate one or more sensors 115 to collect data about the target vehicle 200. For example, the computer 110 can collect data about a speed of the target vehicle 200 and/or a location of the target vehicle 200.

Next, in a block 410, the computer 110 determines longitudinal and lateral constraint values $C_x$, $C_y$. As described above, the constraint values $C_x$, $C_y$ are values based on one of a plurality of virtual boundaries 210, a boundary approach velocity, and a boundary approach acceleration that indicates motion of the host vehicle 105 to the virtual boundaries 210. Based on a sign of the constraint values $C_x$, $C_y$, the computer 110 can determine which virtual boundaries 210 to calculate to determine a steering angle $\delta_{CF}$ and a longitudinal acceleration $\alpha_{CF}$ that the host vehicle 105 should attain to avoid the target vehicle 200.

Next, in a block 415, the computer 110 determines whether the constraint values $C_x$, $C_y$ are below respective thresholds. As described above, the thresholds can be determined based on empirical testing of virtual vehicles in a virtual simulation. For example, the thresholds can both be zero. If both constraint values $C_x$, $C_y$ are below their respective thresholds, the process 400 continues in a block 420. Otherwise, the process 400 continues in a block 425.

In the block 420, the computer 110 determines both a left virtual boundary $h_L$ and a right virtual boundary $h_R$. When both constraint values $C_x$, $C_y$ are below their respective thresholds, the computer 110 can use the virtual boundaries $h_L$, $h_R$ to determine the steering and/or braking to apply based on a location of the target vehicle 200. That is, the computer 110 can determine both virtual boundaries $h_L$, $h_R$ and then determine a steering angle $\delta_{CF}$ and longitudinal acceleration $\alpha_{CF}$ based on movement of the target vehicle 200 toward both virtual boundaries $h_L$, $h_R$. Following the block 420, the process 400 continues in a block 430.

In the block 425, the computer 110 determines one of the left boundary $h_L$ or the right boundary $h_R$. Because only one of the constraint values $C_x$, $C_y$ is below its respective threshold, the target vehicle 200 is not likely a threat, and the computer 110 determines the respective virtual boundary $h_L$, $h_R$ based on the location of the target vehicle 200 relative to the host vehicle 105. For example, if the target vehicle 200 is to the right of the host vehicle 105, the computer 110 determines the left virtual boundary $h_L$ to prevent the host vehicle 105 from drifting out of a current roadway lane and to thereby avoid the target vehicle 200. In another example, if the target vehicle 200 is to the left of the host vehicle 105, the computer 110 determines the right virtual boundary $h_R$ to prevent the host vehicle 105 from drifting out of the current roadway lane and to thereby avoid the target vehicle 200. Following the block 425, the process 400 continues in the block 430.

In the block 430, the computer 110 determines a steering angle $\delta_{CF}$ and a longitudinal acceleration $\alpha_{CF}$ based on the virtual boundaries $h_L$, $h_R$. The computer 110 can determine the steering angle and longitudinal acceleration $\delta_{CF}$, $\alpha_{CF}$ with an optimization program subject to constraints determined by the virtual boundaries $h_L$, $h_R$. For example, the computer 110 can use a quadratic programs algorithm to minimize a cost function $J_{yL}$, $J_{yR}$. In another example, the computer 110 can use a mixed integer linear programming algorithm to solve a control objective.

Next, in a block 435, the computer 110 actuates a steering component 120 and/or a brake 120 to attain the determined steering angle $\delta_{CF}$ and the determined longitudinal acceleration $\alpha_{CF}$. As described above, the computer 110 can determine which of the steering 120 or brake 120 to actuate based on the location of the target vehicle 200 relative to the host vehicle 105. The computer 110 can actuate the components 120 according to the determined steering angle and longitudinal acceleration $\delta_{CF}$, $\alpha_{CF}$ to avoid the target vehicle 200.

Next, in a block 440, the computer 110 determines whether to continue the process 400. For example, the computer 110 can determine to continue upon detecting another target vehicle 200. In another example, the computer 110 can determine not to continue when the host vehicle 105 is powered off. If the computer 110 determines to continue, the process 400 returns to the block 405. Otherwise, the process 400 ends.

Computing devices discussed herein, including the computer 110, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 110 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 400, one or more of the steps could be omitted, or the steps could be executed in a different order than shown in FIG. 4. In other words, the descriptions of systems and/or processes herein are provided for the purpose of illustrating certain embodiments and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

Ordinal adjectives such as "first" and "second" are used throughout this document as identifiers and are not intended to signify importance or order.

The invention claimed is:

1. A system, comprising a computer including a processor and a memory, the memory storing instructions executable by the processor to:
   identify a lateral virtual boundary for a host vehicle based on a lateral distance between the host vehicle and a target vehicle, a longitudinal distance between the host vehicle and the target vehicle, and a speed of the target vehicle relative to the host vehicle;
   identify a forward virtual boundary for the host vehicle based on the longitudinal distance between the host vehicle and the target vehicle;
   determine a lateral constraint value of the lateral virtual boundary based on a lateral boundary speed, the lateral boundary speed based on a heading angle of the host vehicle;
   determine a forward constraint value of the forward virtual boundary based on the heading angle of the host vehicle;
   determine a lane boundary and a lane constraint value based on the lane boundary;
   determine a lane boundary acceleration based on the heading angle of the host vehicle and a current steering angle of the host vehicle;
   determine a longitudinal acceleration and a to-be-attained steering angle based on the lateral and forward virtual boundaries and the lateral and forward constraint values, wherein the to-be-attained steering angle is determined further based on the lane constraint value and a lane boundary acceleration; and
   actuate one or both of a steering component or a brake based on the longitudinal acceleration and the steering angle.

2. The system of claim 1, wherein the instructions further include instructions to determine a left lateral virtual boundary, a right lateral virtual boundary, a left lateral constraint value, and a right lateral constraint value.

3. The system of claim 2, wherein a direction of the to-be-attained steering angle is based on the left lateral virtual boundary satisfying the left lateral constraint value or the right lateral virtual boundary satisfying the right lateral constraint value.

4. The system of claim 2, wherein the instructions further include instructions to determine both the left lateral virtual boundary and the right lateral virtual boundary when the forward constraint value is below a threshold.

5. The system of claim 1, wherein the instructions further include instructions to determine the longitudinal acceleration and the to-be-attained steering angle based on a forward boundary speed satisfying the forward constraint value and the lateral boundary acceleration satisfying the lateral constraint value.

6. The system of claim 1, wherein the instructions further include instructions to, upon determining that the lateral constraint value is below a first threshold and that the forward constraint value is below a second threshold, actuate one or both of the steering component or the brake based on a distance between the host vehicle and the target vehicle and the speed of the target vehicle relative to the host vehicle.

7. The system of claim 6, wherein the instructions further include instructions to actuate only the brake when the speed is below a speed threshold and the distance is above a first distance threshold and to actuate only the steering component when the speed is above the speed threshold and the distance is above a second distance threshold.

8. The system of claim 7, wherein the speed threshold is based on a maximum longitudinal deceleration of the host vehicle and a maximum lateral acceleration of the host vehicle.

9. The system of claim 1, wherein the instructions further include instructions to, upon determining that one of (1) the lateral constraint value exceeds a first threshold or (2) the forward constraint value exceeds a second threshold, suppress actuation of the steering component to move the host vehicle to an adjacent roadway lane.

10. A method, comprising:
identifying a lateral virtual boundary for a host vehicle based on a lateral distance between the host vehicle and a target vehicle, a longitudinal distance between the host vehicle and the target vehicle, and a speed of the target vehicle relative to the host vehicle;
identifying a forward virtual boundary for the host vehicle based on the longitudinal distance between the host vehicle and the target vehicle;
determining a lateral constraint value of the lateral virtual boundary based on a lateral boundary speed, the lateral boundary speed based on a heading angle of the host vehicle;
determining a forward constraint value of the forward virtual boundary based on the heading angle of the host vehicle;
determining a lane boundary and a lane constraint value based on the lane boundary;
determining a lane boundary acceleration based on the heading angle of the host vehicle and a current steering angle of the host vehicle;
determining a longitudinal acceleration and a to-be-attained steering angle based on the lateral and forward virtual boundaries and the lateral and forward constraint values, wherein the to-be-attained steering angle is determined further based on the lane constraint value and a lane boundary acceleration; and
actuating one or both of a steering component or a brake based on the longitudinal acceleration and the to-be-attained steering angle.

11. The method of claim 10, further comprising determining a left lateral virtual boundary, a right lateral virtual boundary, a left lateral constraint value, and a right lateral constraint value.

12. The method of claim 11, wherein a direction of the to-be-attained steering angle is based on the left lateral virtual boundary satisfying the left lateral constraint value or the right lateral virtual boundary satisfying the right lateral constraint value.

13. The method of claim 11, further comprising determining both the left lateral virtual boundary and the right lateral virtual boundary when the forward constraint value is below a threshold.

14. The method of claim 10, further comprising determining the longitudinal acceleration and the to-be-attained steering angle based on a forward boundary speed satisfying the forward constraint value and the lateral boundary acceleration satisfying the lateral constraint value.

15. The method of claim 10, further comprising, upon determining that the lateral constraint value is below a first threshold and that the forward constraint value is below a second threshold, actuating one or both of the steering component or the brake based on a distance between the host vehicle and the target vehicle and the speed of the target vehicle relative to the host vehicle.

16. The method of claim 15, further comprising actuating only the brake when the speed is below a speed threshold and the distance is above a first distance threshold and actuating only the steering component when the speed is above the speed threshold and the distance is above a second distance threshold.

17. The method of claim 16, wherein the speed threshold is based on a maximum longitudinal deceleration of the host vehicle and a maximum lateral acceleration of the host vehicle.

* * * * *